(12) United States Patent
Genik-Sas-Berezowsky et al.

(10) Patent No.: US 6,231,823 B1
(45) Date of Patent: May 15, 2001

(54) SOLVENT EXTRACTION PROCESS FOR THE SEPARATION OF COBALT FROM NICKEL IN AQUEOUS SULPHATE-CONTAINING SOLUTIONS

(75) Inventors: Roman Michael Genik-Sas-Berezowsky, St. Albert; Felix Petrus De Kock, Edmonton; Rein Raudsepp, St. Albert, all of (CA)

(73) Assignee: Dynatec Corporation, Fort Saskatchewan (CA)

( * ) Notice: Subject to any disclaimer, the term of this patent is extended or adjusted under 35 U.S.C. 154(b) by 0 days.

(21) Appl. No.: 09/536,202

(22) Filed: Mar. 27, 2000

(51) Int. Cl.$^7$ .................................................. C22B 23/00
(52) U.S. Cl. ........................................ 423/139; 210/634
(58) Field of Search ............................. 423/139; 210/634

(56) References Cited

U.S. PATENT DOCUMENTS

| 3,767,762 | 10/1973 | Kunda ................................. 423/145 |
| 4,108,640 | 8/1978 | Wallace et al. ......................... 75/103 |

(List continued on next page.)

FOREIGN PATENT DOCUMENTS

| 922522 | 4/1973 | (CA) . |
| 1075474 | 4/1980 | (CA) . |
| 1227339 | 9/1987 | (CA) . |
| 2098638 | 12/1993 | (CA) . |
| 0918094 | 5/1999 | (EP) . |
| 0924307 | 6/1999 | (EP) . |
| 1344549 | 1/1974 | (GB) . |
| 1378040 | 12/1974 | (GB) . |

OTHER PUBLICATIONS

CRC Handbook of Chemistry and Physics 67$^{th}$ Ed., CRC Press, 1986–1987, p. D–147 (ISBN–0–8493–0467–9), No Month.

Primary Examiner—Steven Bos
(74) Attorney, Agent, or Firm—GreenLee, Winner and Sullivan, P.C.

(57) ABSTRACT

An improved process for separating cobalt values from nickel values in an aqueous nickel and cobalt sulphate-containing solution in which the solution is contacted with a water-immiscible organic solution containing an organophosphorous acid in a cobalt extraction circuit. The process is particularly useful for aqueous solutions containing high total metals content and elevated cobalt concentrations, while avoiding the formation and precipitation of ammonium sulphate containing double salts during the solvent extraction of the cobalt. The improvement includes contacting a portion or all of the water-immiscible organic solution required for cobalt extraction with a nickel-containing ammoniacal solution to produce a nickel-loaded organic phase and a partially nickel-depleted raffinate. The nickel-loaded organic phase is then passed to the cobalt extraction circuit for selective cobalt extraction in which nickel is displaced from the organic phase by cobalt, to produce a cobalt-depleted, nickel-enriched, raffinate and a cobalt-loaded organic phase. Advantageously, the nickel-containing ammoniacal solution is generated by adjustment of the nickel-containing raffinate from the cobalt extraction circuit, by additions of ammonia, preferably as ammonium hydroxide, and ammonium sulphate.

35 Claims, 1 Drawing Sheet

U.S. PATENT DOCUMENTS

| | | | |
|---|---|---|---|
| 4,123,260 | 10/1978 | Sefton et al. | 75/117 |
| 4,196,076 | 4/1980 | Fujimoto et al. | 210/21 |
| 4,210,625 | 7/1980 | Flett | 423/139 |
| 4,242,314 | 12/1980 | Motoba et al. | 423/139 |
| 4,246,240 | 1/1981 | Ogata et al. | 423/139 |
| 4,348,367 | 9/1982 | Rickelton et al. | 423/139 |
| 4,353,883 | 10/1982 | Rickelton et al. | 423/139 |
| 4,600,435 | 7/1986 | Wiegers et al. | 75/119 |
| 4,619,816 | 10/1986 | Rickelton | 423/139 |
| 4,721,605 | 1/1988 | Brown et al. | 423/24 |
| 4,900,522 | 2/1990 | Chou et al. | 423/139 |
| 4,956,154 | 9/1990 | Magdics et al. | 423/54 |
| 5,028,403 | 7/1991 | Rickelton et al. | 423/24 |
| 5,174,812 | 12/1992 | Price et al. | 75/628 |
| 5,378,262 | 1/1995 | Mihaylov et al. | 75/722 |
| 5,447,552 | 9/1995 | Mihaylov et al. | 75/722 |
| 5,470,553 | 11/1995 | Hao-Chung et al. | 423/139 |
| 5,605,668 | 2/1997 | Fittock et al. | 423/139 |
| 5,779,997 | 7/1998 | Nyman et al. | 423/139 |
| 5,788,844 * | 8/1998 | Olafson | 423/139 |
| 5,855,858 | 1/1999 | Jones | 423/150.1 |
| 5,888,462 | 3/1999 | Makino et al. | 423/139 |
| 6,149,885 * | 11/2000 | Makino et al. | 423/139 |

* cited by examiner

SOLVENT EXTRACTION PROCESS FOR THE SEPARATION OF COBALT FROM NICKEL IN AQUEOUS SULPHATE-CONTAINING SOLUTIONS

FIELD OF THE INVENTION

The present invention relates to solvent extraction of metals from acidic aqueous solutions containing same. More particularly, the invention is directed to the separation of cobalt values from nickel values in aqueous acid leach solutions.

BACKGROUND OF THE INVENTION

The extraction of cobalt(II) from acidic leach liquors, which also contain nickel(II), is typically conducted by solvent extraction with a water-immiscible organic solution containing an organophosphorous acid, which extracts cobalt(II) in preference to nickel(II). Typical acidic leach liquors contain between 1 and 130 g/L nickel and between 0.3 and 25 g/L cobalt. U.S. Pat. No. 4,353,883, issued Oct. 12, 1982 to Rickelton et al., discloses a process to separate cobalt and nickel values from such aqueous solutions by contacting the aqueous solution with a water-immiscible solvent phase containing an organophosphinic acid extractant of the general formula $R_1R_2PO(OX)$, where $R_1$ and $R_2$ are substituted or unsubstituted alkyl, cycloalkyl, alkoxyalkyl, alkylcycloalkyl, aryl, alkylaryl, aralkyl or cycloalkylaryl radicals, and X is either H or a salt forming cationic species. In this step, cobalt forms an organic soluble complex with the extractant that reports to the organic phase, displacing a stoichiometric amount of X that report to the aqueous phase, along with the majority of the nickel values. After extraction, cobalt in the loaded organic phase can be recovered by stripping with a suitable mineral acid to produce a high concentration cobalt product solution. During this step, the organophosphinic acid is converted to its acid form and is suitable for recycle to the solvent extraction unit operation. Before recycling, the organophosphinic acid can be contacted with a suitable base to displace the hydrogen with the corresponding salt forming radical. A similar solvent extraction process is taught in U.S. Pat. No. 4,348,367, issued Sep. 7, 1982, to Rickelton et al. These patents leave many possible problems unsolved, and in particular, do not deal with a problem of double salt formation, discussed more fully below, and which is specifically addressed by the process of the present invention.

In particular, in the Rickelton et al. patents, if X is a salt forming radical, the extraction reaction will lead to a build-up of this salt, such as sodium sulphate or ammonium sulphate, in the aqueous phase. Similarly, if X is H, the extraction of cobalt will lead to an increase in the acid content of the aqueous phase. This liberated acid has to be neutralized with an appropriate base, such as ammonium or sodium hydroxide, to retain the extractive strength of the organic phase extractant, and in so doing, will also result in a build-up of ammonium or sodium sulphate. The above patents do not address potential problems, such as double salt formation due to a salt build-up, nor do they provide a solution to these problems.

Canadian Patent 1,075,474, issued to Inco Limited (inventors Barnes and Truscott), discloses a process in which cobalt values are separated from nickel values by solvent extraction using an organic solvent phase containing a nickel salt of an organophosphoric acid extractant of the formula $(RO)_2PO(OH)$. The nickel salt of the organophosphoric acid may be generated by first converting the organophosphoric acid to its alkali metal or ammonium salt, and then contacting this salt solution in an organic solvent with a mother liquor from a subsequent nickel salt crystallization step, which produces nickel sulphate crystals from the cobalt solvent extraction raffinate. Alternatively, an organic solution of the acid may be contacted with a nickel base such as nickel hydroxide in an aqueous slurry, although this approach is slow and difficult to use. More preferably, the nickel salt of the organophosphoric acid is generated by mixing an organic solution of the organophosphoric acid with an aqueous solution of nickel sulphate and an aqueous alkaline solution such as sodium hydroxide in a single step. Although ammonium hydroxide is listed as an alternative to sodium hydroxide, there is no teaching of how to avoid the production of double salts or metal hydroxides. For instance, in the case of Example 1 of CA 1,075,474, if ammonium hydroxide had been used as a neutralization reagent in place of sodium hydroxide, a raffinate containing 46.7 g/L Ni and 138 g/L $(NH_4)_2SO_4$, would have been produced, according to our calculations. Such a composition would, in our experience, result in double salt precipitation. The patent only teaches stoichiometric addition of the neutralizing agent, based on the extraction stoichiometry. In this patent, and in the patents issued to Rickelton et al., there is no mention of ammonium sulphate, the neutralization product, which would be produced if ammonium hydroxide were used for neutralization in the cobalt extraction circuit. More particularly, there is no mention of the potential deleterious effect of ammonium sulphate on the solubility of nickel during the extraction of the cobalt. There is only a teaching of minimizing the contamination of the nickel raffinate with sodium or ammonium.

Furthermore, regarding the prior art associated with the conditions at which a nickel loaded organic phase is formed, there is no mention of the role of, nor in fact, any need for, ammonium sulphate in the feed solution to the nickel loading step as now recognized by the inventors of the present invention. In CA 1,075,474, this feed solution to the nickel loading step is stream 17 in both Figures. Nor is there any recognition of a need to maintain a prerequisite ammonia concentration in this feed solution, in combination with the ammonium sulphate, to prevent the precipitation of the nickel as either a double salt or a hydroxide, hereagain as recognized by the inventors of the present invention. Thus, there is no recognition by the prior art that, as recognized by the inventors of the present application, if the process were practiced according to the patent teachings, the ammonium sulphate would have a deleterious effect, as it would promote the precipitation of the nickel as a double salt.

Overall, CA 1,075,474 can be summarized by the following equations, when sodium hydroxide is used for neutralization, with the overbar representing the organic phase and RH representing the organophosphorous acid extractant:

Extraction: $2\overline{RH}+CoSO_4+2NaOH \leftrightarrow \overline{R_2Co}+Na_2SO_4+2H_2O$     (1)

Stripping: $\overline{R_2Co}+H_2SO_4 \leftrightarrow 2\overline{RH}+CoSO_4$     (2)

In reality, the base used for neutralization must be carefully selected based on the operability of the solvent extraction circuit and in consideration of the other process units, as it will accumulate in the nickel containing raffinate. If, for instance, electrowinning is selected for final recovery of nickel from the solvent extraction raffinate, it would be undesirable to use ammonium hydroxide for neutralization, as ammonium cannot be tolerated during the electrowinning step, and sodium hydroxide will be the preferred neutralization reagent.

If hydrogen reduction is selected for final nickel recovery, sodium hydroxide will be undesirable, as it will lead to sodium contamination of not only the nickel product, but also the ammonium sulphate salt, which is recovered from the barren reduction end solution by crystallization. Therefore, if hydrogen reduction is used, ammonium hydroxide will be the preferred neutralization reagent. However, this reagent has a disadvantage in that the ammonium sulphate produced during the solvent extraction of cobalt, will reduce the solubility of nickel in the raffinate, depending on the relative metals and ammonium sulphate concentrations, the temperature and the solution pH. If the solubility limit is exceeded, nickel will precipitate from solution as a nickel sulphate-ammonium sulphate double salt ($NiSO_4 \cdot (NH_4)_2SO_4 \cdot 6H_2O$).

If ammonium hydroxide is substituted in reaction (1) for the neutralization, the amount of ammonium sulphate produced is stoichiometric to the amount of cobalt extracted, i.e., the higher the cobalt concentration in the feed solution, the more ammonium sulphate will be produced. Reduced nickel solubility will, therefore, not present a significant problem if solutions with low total metals (cobalt and nickel) concentrations are treated. However, solutions with high total metals concentrations, typically more than 100 g/L, are usually targeted to reduce the capital and operating costs in a metals refinery. Precipitation of double salts during the treatment of these streams is, therefore, a greater possibility under conditions such as those targeted in the cobalt extraction circuit, especially if the feed solution has a high cobalt and nickel content.

One solution is to dilute the leach solution prior to separation of cobalt and nickel by solvent extraction. However, this will reduce the nickel concentration in the raffinate, requiring larger final recovery equipment, or necessitating an additional nickel recovery step.

The patents issued to Rickelton et al., and CA 1,075,474 both mention the use of a nickel form of the organic extractant, however, no other teaching is provided of how to practice their processes with this extractant in order to avoid the production of double salts.

The solvent extraction process with neutralization, for the specific case of nickel and cobalt separation can be simplified as follows, RH representing the organophosphorous acid extractant and the overbar representing the organic phase:

Extraction: $2\overline{RH} + CoSO_4 \leftrightarrow \overline{R_2Co} + H_2SO_4$     (3)

Neutralization: $H_2SO_4 + 2NH_3 \rightarrow (NH_4)_2SO_4$     (4)

Combined: $2\overline{RH} + CoSO_4 + 2NH_3 \leftrightarrow \overline{R_2Co} + (NH_4)_2SO_4$     (5)

Canadian Patent 2,098,638, issued Apr. 21, 1998, to Outokumpu Harjavalta Metals Oy, and U.S. Pat. No. 5,779,997, issued Jul. 14, 1998, and assigned to this same company, disclose a method to prevent the formation of jarosite in the leaching step, and ammonium-based double salts in the solvent extraction step, in a process to separate valuable metals, cobalt and nickel being specific examples, from acidic solutions generated in leaching processes. An organic solvent phase containing an organophosphoric, organophosphonic or organophosphinic extractant is used to achieve cobalt-nickel separation. The patents propose a process whereby the acid form of the organic extractant is first neutralized with an alkaline solution such as ammonium or sodium hydroxide, to convert the organic to the corresponding salt form. In a second step, this organic salt solution is contacted with a preload solution containing an intermediate metal, in this case magnesium, to produce an organic phase loaded with the intermediate metal, and a salt discharge solution from which the salt can be recovered by crystallization. In a further process step, the organic phase loaded with the intermediate metal is contacted with the cobalt and nickel containing solution. In this step, the intermediate metal is displaced from the organic phase to produce a cobalt-loaded organic phase and a nickel raffinate that is enriched in the intermediate metal. As ammonium or sodium double salt or jarosite forming species are not displaced into the nickel containing aqueous raffinate, the likelihood of precipitation during cobalt recovery by solvent extraction is considerably reduced. An additional amount of the intermediate metal is added to barren solution from one of the final nickel recovery steps, hydrogen reduction, to generate the solution for the intermediate metal loading step, while barren solution from the electrowinning circuit is recycled to the leach step.

To the inventors' knowledge, the above outlined method has never been commercially used and has a number of potential difficulties, including:

The intermediate metal used, in this case magnesium, has to be recovered downstream from the solvent extraction circuit, in this specific case, from the nickel reduction end solution or spent electrolyte.

Due to incomplete recovery of the intermediate metal, a make-up is required.

Due to incomplete recovery of the intermediate metal in the loading step, contamination of the final products, in this case ammonium sulphate, cobalt and nickel, by the intermediate metal, in this case magnesium, can be expected.

In the intermediate solvent extraction step, essentially complete extraction of the intermediate metal is required to reduce the make-up requirement of the intermediate metal, and to produce an aqueous discharge solution suitable for the recovery of a pure salt product by crystallization, in this case ammonium sulphate.

A large number of theoretical stages are required to get reasonable extraction of the intermediate metal in the preload step.

There is still a need for a viable process to separate nickel and cobalt from acidic sulphate leaching solutions, which accomplishes neutralization in accordance with the above reactions, but avoids the formation of double salts.

SUMMARY OF THE INVENTION

The present invention provides an improvement in a solvent extraction process for separating cobalt and nickel, both present as divalent ions, from acidic aqueous solutions containing same, wherein an organophosphorous acid is used as the extractant, and ammonia, typically as ammonium hydroxide, is used as a neutralization agent. The improvement provided by the process of this invention prevents the direct transfer of appreciable ammonium ions, which are generated during neutralization, to the cobalt extraction raffinate, where precipitation of double salts is more likely.

Broadly stated, the process of the present invention provides an improvement in a process for separating cobalt values from nickel values, both as divalent ions, in an aqueous cobalt-containing, nickel sulphate solution in which the solution is contacted with a water-immiscible organic solution containing an acidic organic cationic extractant selective for cobalt over nickel in a cobalt extraction circuit so as to transfer the cobalt values from the aqueous solution to the organic solution, and separating the organic solution containing transferred cobalt values from an aqueous nickel-containing raffinate solution. The improvement comprises the additional steps of:

a) contacting a portion or all of the water-immiscible organic solution required for cobalt extraction with a nickel-containing ammoniacal solution to produce a nickel-loaded organic phase and a partially nickel-depleted raffinate; and b) passing the nickel-loaded organic phase to the cobalt extraction circuit for selective cobalt extraction in which cobalt displaces nickel from the organic phase to produce a cobalt-depleted, nickel-enriched, raffinate, and a cobalt-loaded organic phase.

In a preferred embodiment of the process, the nickel-containing ammoniacal solution used in (a) is generated by additions of ammonia, preferably as ammonium hydroxide, and ammonium sulphate to a portion or all of the aqueous nickel-containing raffinate from the cobalt extraction circuit.

In another broad aspect of the invention, there is provided a process for separating cobalt values from nickel values in an aqueous cobalt-containing, nickel sulphate solution in which the aqueous solution is contacted with a water-immiscible organic solution containing an acidic organic cationic extractant selective for cobalt over nickel, in a cobalt extraction circuit so as to transfer the cobalt values from the aqueous solution to the organic solution, and separating the organic solution containing transferred cobalt values from an aqueous nickel-containing raffinate solution. The process comprises:

a) contacting the water-immiscible organic solution required for cobalt extraction with a nickel-containing ammoniacal solution in a nickel preload step to produce a nickel-loaded organic phase and a partially nickel-depleted raffinate;

b) contacting the aqueous cobalt-containing nickel sulphate solution in the cobalt extraction circuit with the nickel-loaded organic phase from step (a) to produce a cobalt-depleted, nickel-enriched, raffinate, and a cobalt-loaded organic phase;

c) optionally recycling a portion or all of the cobalt-depleted, nickel-enriched, raffinate from (b) to a solution adjustment step in which ammonia, preferably as ammonium hydroxide, and ammonium sulphate is added to the cobalt-depleted, nickel-enriched, raffinate to produce the nickel-containing ammoniacal solution used in step (a);

d) optionally combining the partially nickel-depleted raffinate from step (a) with the remaining cobalt-depleted, nickel-enriched, raffinate from step (b);

e) recovering cobalt from the cobalt-loaded organic phase from step (b); and f) recovering nickel from the aqueous raffinates from step (a) and (b), or from the combined aqueous raffinates from step (d).

By the term "ammoniacal solution" is meant that there remains "free" ammonia in the solution, wherein "free" ammonia is defined as "acid titratable" ammonia. Acid titratable ammonia exists when titrated with 2.94 N $H_2SO_4$, using Congo Red as an indicator. The CRC Handbook of Chemistry and Physics 67th Ed., CRC Press, 1986–1987, p. D-147 (ISBN-0-8493-0467-9), reports that this indicator changes colour in the pH range of 3.0 to 5.0.

The term "raffinate" is used herein to refer to the aqueous phase that separates from the organic phase.

The above processes are preferably conducted by adjusting aqueous nickel-containing raffinate produced in the cobalt extraction step with additions of ammonia and ammonium sulphate to result in a molar ratio of ammonia to nickel of between 1.6 to 2.1:1, and providing sufficient ammonium sulphate to prevent the hydrolysis and precipitation of nickel as a hydroxide or basic nickel sulphate, but avoiding an excess of ammonium sulphate, which has a deleterious effect on the nickel loading characteristics in the nickel preload step. This solution adjustment step can be represented by the following reaction:

Solution Adjustment Step: $NiSO_4 + 2NH_4OH \rightarrow Ni(NH_3)_2SO_4 + 2H_2O$    (6)

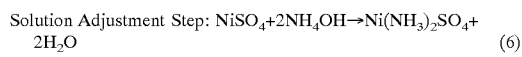

As an example, in an adjusted solution containing about 80 g/L nickel, an ammonia to nickel molar ratio of at least 1.6:1 is required to prevent the precipitation of nickel containing double salts, while an ammonia to nickel molar ratio of more than 2.1:1 has a detrimental effect on the phase disengagement rate in the subsequent nickel preload step. Similarly, the ammonium sulphate content for an adjusted solution containing about 80 g/L nickel should be between 60 and 200 g/L. At lower ammonium sulphate concentrations, there is a risk of precipitation of nickel hydroxide or basic nickel sulphate, while the organic loading of nickel during the preload step is depressed at higher ammonium sulphate concentrations. For 80 g/L nickel in the adjusted solution, the optimum ammonium sulphate content is about 85±10 g/L. The resultant pH, following solution adjustment is in the range of about 6.5 to 7.5, more typically about 6.8 to 7.3. The pH is dependent on the free ammonia concentration resulting from the ammonia to nickel ratio, so the pH is not an independent variable. Also, the range of ammonium sulphate given is for a particular nickel concentration of about 80 g/L. However, the process of the present invention is capable of practice on aqueous cobalt-containing nickel sulphate solutions having nickel concentrations in the range of 50 to 130 g/L, typically 60 to 120 g/L, cobalt concentrations of 3 to 30 g/L, more typically 6 to 15 g/L, and a Ni:Co ratio of from 3 to 15:1, more typically 4 to 10:1, and most typically 6 to 8:1. At these different compositions, the process requires appropriate adjustments of the $NH_3$:Ni ratio and the amount of ammonium sulphate in the solution adjustment step.

The nickel preload step of the solution adjustment circuit can be represented as follows:

Nickel Preload: $Ni(NH_3)_2SO_4 + 2\overline{RH} \leftrightarrow \overline{R_2Ni} + (NH_4)_2SO_4$    (7)

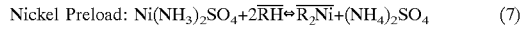

In this step, an organic solvent phase, preferably containing an organophosphorous acid as the extractant, is contacted with the nickel containing ammoniated aqueous solution to generate a nickel-loaded organic phase in which the nickel is coordinated with the organophosphorous acid extractant, and a nickel depleted and ammonium sulphate enriched aqueous raffinate.

The nickel-loaded organic solvent phase so produced is then contacted with the aqueous cobalt-containing nickel sulphate solution for separation of the cobalt and nickel by the selective extraction of cobalt in a separate solvent extraction step. In this step, the bulk of the cobalt displaces the nickel from the organic phase to produce an essentially nickel free, cobalt-loaded organic phase and a cobalt-depleted, nickel-enriched, raffinate. During this extraction reaction, which is represented below, essentially no additions of neutralization reagents are required, thereby limiting the amount of ammonium sulphate produced during the cobalt solvent extraction step.

Cobalt Extraction:  (8)

A minor portion of the cobalt might be extracted according to reaction 5. As appreciated by one skilled in the art, cobalt extraction by this reaction should be minimized to prevent excessive ammonium sulphate production.

The cobalt-loaded organic phase so produced is then subjected to appropriate scrubbing and stripping operations, as known in the art. The remainder of the cobalt-depleted, nickel-enriched aqueous raffinate from the cobalt extraction step (8), after a portion of this stream is forwarded to the solution adjustment step (6), can be combined with the aqueous raffinate from the nickel preload step (7), for final nickel recovery by, for example, hydrogen reduction techniques.

DESCRIPTION OF THE PREFERRED EMBODIMENT

Figure 1:
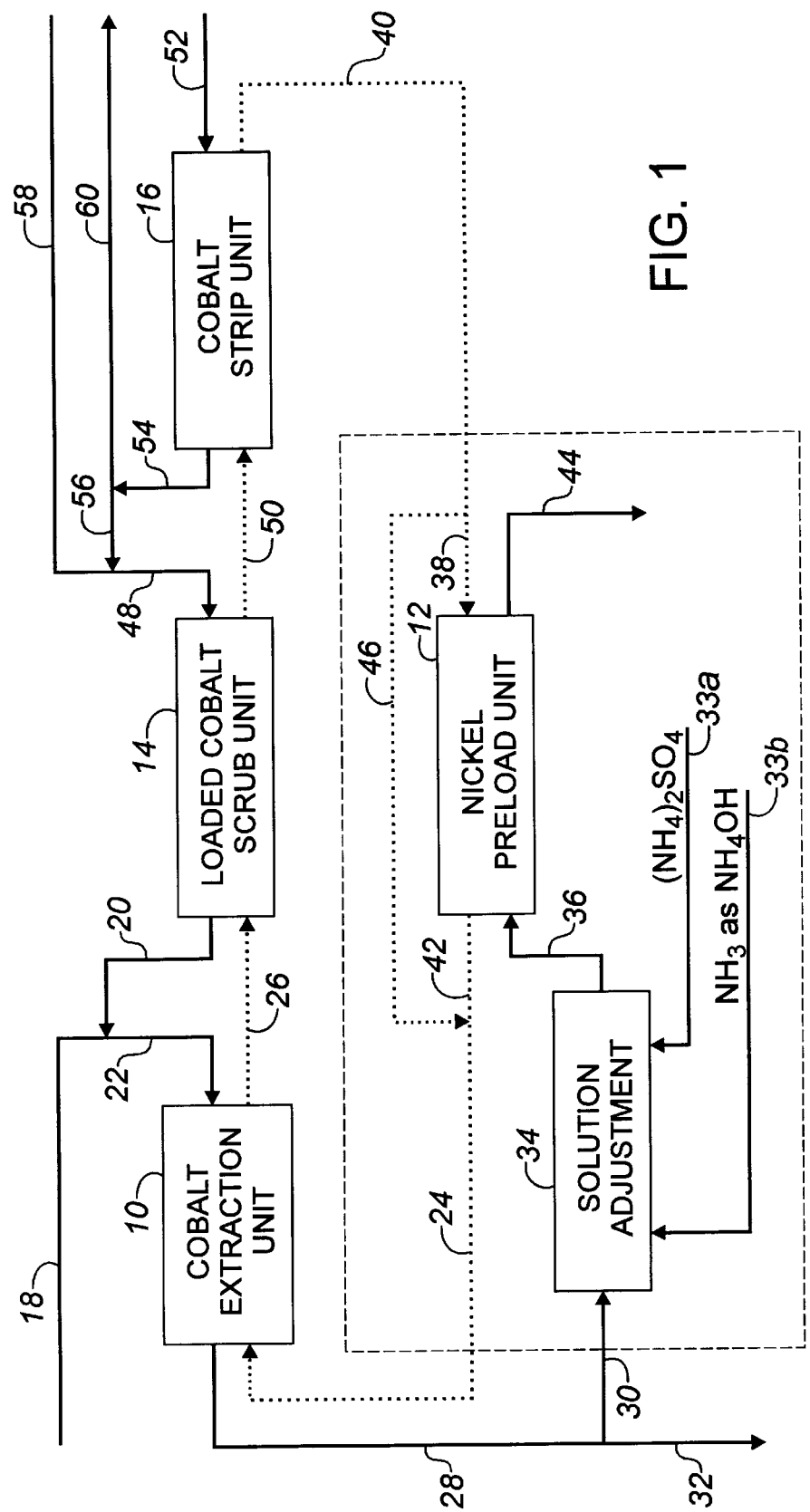
FIG. 1 is a schematic flow sheet showing the process of the present invention operated as a continuous process, the dotted line box indicating the additional steps of the process of the present invention, the dotted lines between boxes indicating the organic phase, and the solid lines between boxes indicating the aqueous phase.

The process of the present invention is described as a continuous process, with reference to the schematic flow sheet of FIG. 1, but may be conducted batchwise, continuously, co-current, continuously counter-current or continuously cross-current, within the scope of the present invention.

The feedstock for the process of the present invention is an aqueous solution containing both nickel and cobalt, present as divalent ions, metal values in the form of sulphates. Generally, the feedstock will contain between about 50 and 130 g/L of nickel, and 3 to 30 g/L of cobalt, more typically 60 to 120 g/L of nickel and 6 to 15 g/L of cobalt, with minor or trace amounts of such other metals as iron and aluminum, and which could also contain one or more of the metals zinc, copper, manganese and magnesium, at a concentration of between about 0.1 and 15 g/L but more preferably between about 0.1 and 3 g/L. These ranges are indicative, but not limiting, to the scope of the invention. The Ni:Co ratio of the feedstock may vary widely, but will generally be in the range of 3 to 15:1, more typically in the range of 4 to 10:1 and most typically in the range of 6 to 8:1. The ratio which can be treated will depend on the relative nickel and ammonium sulphate concentrations in the resulting raffinate. These concentrations, and thus the minimum Ni:Co ratio, can be influenced by the neutralization of free acid in the aqueous leach solution, or the removal of impurities such as iron, copper and zinc from the feed solution prior to the solvent extraction unit operation, as ammonium sulphate is produced when using ammonia or ammonium hydroxide as the neutralizing reagent, during all of these unit operations.

The organic extractant used in the water-immiscible organic solution is an acidic organic cationic extractant selective for cobalt over nickel, such as an organophosphorous acid, that is an organophosphoric acid, an organophosphonic acid or an organophosphinic acid, all of which are well known in the art. For example, exemplary organophosphoric acids are described in Canadian Patent 922,522, exemplary organophosphonic acids are described in U.S. Pat. Nos. 4,196,076; 4,242,314; and 4,246,240, and exemplary organophosphinic acids are described in U.S. Pat. Nos. 4,348,367 and 4,353,883. Other examples of suitable extractants are carboxylic acid, dithiophosphoramide, and monothiophosphinic acid or modified versions or combinations thereof, such as salts and esters. A preferred organophosphoric acid is D2EHPA (for example available as DP-8R from Daihachi, Japan); a preferred organophosphonic acid is PC-88A (available from Daihachi, Japan); and a preferred organophosphinic acid is CYANEX® 272 (available from Cytec, Canada). Of these, the phosphinic acids are most preferred, an exemplary acid of this type being CYANEX 272 (bis(2,4,4-trimethylpentyl)phosphinic acid), as it has the best selectivity for cobalt over nickel.

The make up of the water-immiscible organic solution containing the organophosphorous acid with organic diluents and phase modifiers is well known in the art, for example, as taught in U.S. Pat. No. 4,353,883 and others referred to above.

The process of the present invention is described with reference to FIG. 1, assuming that CYANEX 272 is used as the organophosphorous acid extractant reagent, and assuming a feed solution is a cobalt-containing nickel sulphate solution.

In FIG. 1, a preferred embodiment of the process of this invention is shown to include a cobalt extraction unit at 10, a nickel preload unit at 12, a loaded cobalt scrub unit at 14, and a cobalt strip unit at 16. The units 10, 14 and 16 are all well known in the art. The nickel preload unit 12 is added in accordance with the process of the present invention. An aqueous cobalt-containing nickel sulphate solution 18, preferably combined with the spent scrub solution 20 from the scrub unit 14, provides a combined feed solution 22 to the cobalt extraction unit 10. In the cobalt extraction unit 10, the feed solution 22 is contacted with the nickel-loaded organic phase 24 from the nickel preload unit 12, in a countercurrent flow configuration to produce a cobalt-loaded organic phase 26 and a cobalt-depleted, nickel-enriched raffinate 28. The pH in the cobalt extraction unit 10 is preferably controlled in the range of 4.8 to 6.0, more preferably 5.2 to 5.8, by additions of minor amounts of ammonium hydroxide, if required, while the ratio of aqueous to organic phase in the unit 10 is selected based on the extractant concentration in the organic solution and the cobalt concentration in the feed solution 22. The aqueous to organic phase ratio will generally be in the range of 0.5 to 2:1, more preferably about 1:1 by volume. A portion 30 of the cobalt-depleted raffinate 28 from the cobalt extraction unit 10 is forwarded to the nickel preload unit 12, while the remainder 32 is removed from the circuit and advances to the final nickel recovery unit operations (not shown). The portion 30 is adjusted by additions of ammonium sulphate 33a and ammonium hydroxide 33b in a solution adjustment step 34, to produce an adjusted solution 36 suitable for the nickel preload unit 12. The adjusted solution 36 is contacted in the nickel extraction unit 12 with all, or a portion, 38 of the acid form of the organic phase 40 discharged from the cobalt strip unit 16 to produce a nickel-loaded organic phase 42 and a partially nickel-depleted, and ammonium sulphate enriched, raffinate 44. A portion 46 of the organic phase 40 from the cobalt strip section 16 can bypass the nickel preload unit 12 and can be combined with the nickel-loaded organic phase 42 to target a specific conversion to the nickel salt in the nickel-loaded organic phase 24 fed to the cobalt extraction unit 10. An aqueous to organic phase ratio of between 0.2 and 5:1, typically about 1:1, can be selected for the nickel preload unit 12. The partially nickel-depleted raffinate 44 from the nickel preload unit 12 is advanced, possibly after combination with 32, to the final nickel recovery unit operations (not shown, but well known in the art).

The cobalt-loaded organic phase 26 from the cobalt extraction unit 10 is advanced to the loaded cobalt scrub unit 14, where it is scrubbed with an aqueous scrub solution 48 to remove co-extracted nickel and entrained nickel-containing solution from the cobalt-loaded organic phase 26, thereby producing a purified cobalt-loaded organic phase 50 and a nickel-containing spent scrub solution 20. In the scrub unit 14, the two phases are contacted countercurrent at a aqueous to organic phase ratio of between 0.02 and 0.1:1, typically 0.05:1 by volume, while the pH is preferably controlled between 4.0 and 6.0, more typically between 4.5 and 4.8. The purified cobalt-loaded organic phase 50 is advanced to the cobalt strip unit 16 where it is contacted in a countercurrent configuration with a mineral acid 52 (or return electrolyte if electrowinning is used for cobalt recovery), to produce an aqueous cobalt product solution 54 and a stripped organic phase 40 containing the extractant in its acid form. The mineral acid may be one of the common mineral acids such as sulphuric acid, hydrochloric acid, or nitric acid, but is preferably sulphuric acid. The aqueous to organic phase ratio in the cobalt strip unit 16 is selected based on the acid strength and the cobalt content in the purified organic phase 50, but will typically be between 0.05 and 1.5:1 by volume. A portion 56 of the aqueous cobalt product solution 54 is diluted with process water 58 to produce the scrub solution 48 for purifying the cobalt-loaded organic phase 26, with the remainder of the aqueous cobalt product solution 60 being advanced to the final cobalt recovery unit operations (not shown, but well known in the art).

The temperature for all of the operations 10, 12, 14 and 16 can be controlled between ambient and 95° C., but is more preferably controlled at between 45 and 65° C., most preferably between 50 and 60° C.

While preferred ratios of aqueous to organic phases are given above, a wide range may be used, depending on the concentrations of the metals in the aqueous phase and the organic phase capacity.

The conditions selected for the nickel preload unit 12, and the resulting nickel loading in the nickel-loaded organic phase 42 are important parameters of the process of the present invention. Under the conditions selected for nickel preloading, the portion of the extractant not coordinated with the nickel will coordinate with ammonium to produce the ammonium salt of the extractant. It is therefore important to obtain high nickel loadings in the stream 42 to minimize the transfer of the ammonium from the nickel preload unit 12 to the cobalt extraction unit 10. If it is required that only a portion of the organic phase capacity need to be converted to the nickel form in order to prevent double salt precipitation, only a portion 38 of the organic phase 40 from the cobalt strip unit 16 should be advanced to the nickel preload unit 12, with the remainder 46 being combined with the nickel-loaded organic phase 42 from the nickel preload unit 12 to form the organic phase 24 that is advanced to the cobalt extraction unit 10.

The process is preferably conducted by controlling the molar ratio of $NH_3$:Ni to be sufficient to avoid precipitation of nickel containing double salts, preferably in the range of about 1.6 to 2.1:1, and by controlling the ammonium sulphate content to avoid hydrolysis of nickel and precipitation of nickel containing species. The process is particularly useful for aqueous cobalt-containing nickel sulphate solutions having a nickel content in the range of 50 to 130 g/L (more typically 60 to 120 g/L) and a cobalt content of between 3 and 30 g/L (more typically 6 to 15 g/L), and in a Ni:Co ratio of from 3 to 15:1, more typically 4 to 10:1, and most typically 6 to 8:1.

Aqueous and organic contact in the cobalt extraction unit 10 and in the nickel extraction unit 12 is generally achieved in a known device termed a mixer-settler, although other solvent extraction devices may be used. In the mixers, one phase is dispersed within the other by stirring or some other appropriate form of agitation. The extraction solvent forms a complex with the metals to be extracted, which reports to the organic phase of the two phase mixture. The dispersion is then flowed to a settler where phase disengagement occurs under quiescent conditions.

Final recovery of the cobalt from the cobalt-enriched organic phase is generally achieved by scrubbing and stripping steps, as is well known in the art. Recovery of the nickel from the aqueous raffinates is generally achieved by hydrogen reduction, as is well known in the art.

Advantages

In the nickel preload step complete extraction of nickel is not required (as is magnesium extraction in U.S. Pat. No. 5,779,997). In fact, complete extraction is not desired since the nickel remaining in the nickel preload raffinate will be combined with the remaining aqueous raffinate from the cobalt extraction unit for combined subsequent nickel recovery by, for example, hydrogen reduction.

During the preload operation, high utilization of the capacity of the organic solvent phase (conversion to the nickel salt) is achieved within a single stage.

The process uses only reagents already present in known cobalt-nickel separation processes. Ammonium hydroxide and ammonium sulphate used in generating the nickel-containing ammoniacal solution, are reagents required in the cobalt extraction unit and/or the subsequent nickel recovery unit (hydrogen reduction). As no other species or reagents are added to the process, possible contamination of the final products is avoided and the overall process is simplified.

The overall objective of selectively extracting cobalt from a cobalt and nickel containing solution, with neutralization of the stoichiometric amount of liberated acid, is achieved without the formation and precipitation of nickel-containing double salts.

EXAMPLES

The process of this invention is demonstrated with reference to the following non-limiting examples. Example 1, illustrating the prior art, was conducted in batch mode, while Examples 2 and 3 were from results obtained during continuous testwork in a circuit consisting of mixer-settler units.

Example 1
Nickel Double Salt Precipitation During Prior Art Extraction

This example illustrates the problem of nickel sulphate-ammonium sulphate double salt precipitation during metal extraction under pH control (neutralization). Bis(2,4,4-trimethylpentyl)phosphinic acid, commercially available as CYANEX® 272, was dissolved in a diluent, Shellsol® 2046 (which is a refined kerosene product supplied by The Shell Company of Australia), to obtain a concentration of 20% by volume in an organic phase. In addition to the extractant, the organic phase also included a phase modifier, tri-n-butyl phosphate, in an amount of 10% by volume. The above organic phase was contacted with an aqueous solution, containing 91 g/L nickel, 7 g/L cobalt, 1.4 g/L zinc and 15 g/L ammonium sulphate at 50° C., at an aqueous to organic volumetric phase ratio of 2:1. Under agitation, ammonium hydroxide was added to the combined phases to adjust the pH to about 5.0. The experiment was terminated due to the precipitation of a large amount of nickel sulphate-ammonium sulphate double salt. Complete extraction of cobalt and zinc would result in an ammonium sulphate content in the discharge raffinate of 34 g/L, which reduced the nickel solubility, resulting in the precipitation of the above salt.

Example 2
Nickel Preload

This example illustrates the nickel preload step of the process of the present invention, in a continuous process using traditional mixer-settler equipment, so as to avoid the production of nickel double salts. An organic phase as described for Example 1 was used in this example. At 50° C., the organic phase described in Example 1 was contacted with an aqueous solution (1:1 A:O ratio and operating the mixer in an aqueous continuous mode) containing 76 g/L nickel, 80 g/L ammonium sulphate and 42 g/L free ammonia, corresponding to a free ammonia to nickel molar ratio ($NH_3$:Ni) of 1.9:1. The pH of the resultant aqueous continuous emulsion was about 7.1. The two phases were allowed to separate in the settler. The organic phase was loaded to between 12.4 and 14.7 g/L nickel, averaging 13.4 g/L, whereas the raffinate contained about 63 g/L nickel and 114 g/L ammonium sulphate.

Example 3
Cobalt Extraction with Nickel-Loaded Organic

This example illustrates how the nickel-loaded organic phase produced in Example 2 can be used to extract cobalt at the preferred operating conditions of the process of this invention. Seven parts of the nickel-loaded organic phase produced in Example 2 was combined with three parts of an organic phase of the same composition, but in the acid form. The combined organic phase so produced was contacted at 50° C. with an aqueous solution containing 11 g/L cobalt, 89 g/L nickel and 10 g/L ammonium sulphate at an aqueous to organic ratio of about 1.1:1 on a continuous basis in a multistage countercurrent extraction circuit under pH control. It is important to note that the selection of the aqueous to organic ratio is dependent on the extractant content in the organic phase, and the composition of the aqueous feed solution, and the ratio will be adjusted as these compositions vary. The aqueous discharge solution from this contact contained 95 g/L nickel, about 13 g/L ammonium sulphate and less than 0.01 g/L cobalt. Had the extraction been conducted as per example 1, where ammonia was used for pH control, the raffinate would have contained about 36 g/L ammonium sulphate. Thus, the amount of ammonium sulphate produced during cobalt extraction was reduced by more than 90%. No precipitation of double salts was observed.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions used in this specification are used as terms of description and not of limitation. There is no intention, in using such terms and expression of excluding equivalents of the features shown and described, it being recognized that the scope of the invention is defined and limited only by the claims which follow.

We claim:

1. In a process for separating cobalt values from nickel values, both as divalent ions, in an aqueous cobalt-containing, nickel sulphate solution in which the solution is contacted with a water-immiscible organic solution containing an acidic organic cationic extractant selective for cobalt over nickel in a cobalt extraction circuit so as to transfer the cobalt values from the aqueous solution to the organic solution, and separating the organic solution containing transferred cobalt values from an aqueous nickel-containing raffinate solution, the improvement comprising the additional steps of:
   (a) contacting at least a portion of the water-immiscible organic solution containing an acidic organic cationic extractant selective for cobalt over nickel with a nickel-containing ammoniacal solution to produce a nickel-loaded organic phase and a partially nickel-depleted raffinate; and
   (b) passing the nickel-loaded organic phase to the cobalt extraction circuit for selective cobalt extraction in which cobalt displaces nickel from the organic phase to produce a cobalt-depleted, nickel-enriched, raffinate, and a cobalt-loaded organic phase.

2. The process as set forth in claim 1, wherein the ammoniacal solution is controlled to have an $NH_3$:Ni molar ratio sufficient to avoid precipitation of nickel-containing species.

3. The process as set forth in claim 1 wherein the ammoniacal solution is controlled to have an ammonium sulphate content sufficient to avoid hydrolysis of nickel and precipitation of nickel-containing species.

4. The process as set forth in claim 2, wherein the ammoniacal solution is controlled to have an ammonium sulphate content sufficient to avoid hydrolysis of nickel and precipitation of nickel-containing species.

5. The process as set forth in claim 2, wherein the ammoniacal solution from step (a) has an $NH_3$:Ni molar ratio in the range of about 1.6 to 2.1:1.

6. The process as set forth in claim 4, wherein the ammoniacal solution from step (a) has an $NH_3$:Ni molar ratio in the range of about 1.6 to 2.1:1.

7. The process as set forth in claim 1, wherein the nickel-containing ammoniacal solution used in step (a) is generated by adding ammonia and ammonium sulphate to a portion or all of the cobalt-depleted, nickel-enriched, raffinate from step (b).

8. The process as set forth in claim 2, wherein the nickel-containing ammoniacal solution used in step (a) is generated by adding ammonia and ammonium sulphate to a portion or all of the cobalt-depleted, nickel-enriched, raffinate from step (b).

9. The process as set forth in claim 3, wherein the nickel-containing ammoniacal solution used in step (a) is generated by adding ammonia and ammonium sulphate to a portion or all of the cobalt-depleted, nickel-enriched, raffinate from step (b).

10. The process as set forth in claim 6, wherein the nickel-containing ammoniacal solution used in step (a) is generated by adding ammonia and ammonium sulphate to a portion or all of the cobalt-depleted, nickel-enriched, raffinate from step (b).

11. The process as set forth in claim 10, wherein the acidic cationic extractant is an organophosphorous acid.

12. The process as set forth in claim 11, wherein the organophosphorous acid is a phosphoric, phosphonic or phosphinic acid.

13. The process as set forth in claim 1, wherein the aqueous cobalt-containing nickel sulphate solution which is fed to the process has a nickel content in the range of 50 to 130 g/L and a cobalt content of between 3 and 30 g/L.

14. The process as set forth in claim 6, wherein the aqueous cobalt-containing nickel sulphate solution which is fed to the process has a nickel content in the range of 50 to 130 g/L and a cobalt content of between 3 and 30 g/L.

15. The process as set forth in claim 10, wherein the aqueous cobalt-containing nickel sulphate solution which is fed to the process has a nickel content in the range of 50 to 130 g/L and a cobalt content of between 3 and 30 g/L.

16. The process as set forth in claim 12, wherein the aqueous cobalt-containing nickel sulphate solution which is fed to the process has a nickel content in the range of 50 to 130 g/L and a cobalt content of between 3 and 30 g/L.

17. The process as set forth in claim 1, wherein the aqueous cobalt-containing nickel sulphate solution which is fed to the process has a nickel content in the range of 60 to 120 g/L.

18. The process as set forth in claim 6, wherein the aqueous cobalt-containing nickel sulphate solution which is fed to the process has a nickel content in the range of 60 to 120 g/L.

19. The process as set forth in claim 10, wherein the aqueous cobalt-containing nickel sulphate solution which is fed to the process has a nickel content in the range of 60 to 120 g/L.

20. The process as set forth in claim 16, wherein the aqueous cobalt-containing nickel sulphate solution which is fed to the process has a nickel content in the range of 60 to 120 g/L.

21. The process as set forth in claim 20, wherein the aqueous cobalt-containing nickel sulphate solution which is fed to the process contains these metals in a Ni:Co ratio of from 3 to 15:1.

22. The process as set forth in claim 20, wherein the aqueous cobalt-containing nickel sulphate solution which is fed to the process contains these metals in a Ni:Co ratio of from 4 to 10:1.

23. The process as set forth in claim 20, wherein the aqueous cobalt-containing nickel sulphate solution which is fed to the process contains these metals in a Ni:Co ratio of from 6 to 8:1.

24. The process as set forth in claim 21, wherein the aqueous cobalt-containing nickel sulphate solution which is fed to the process contains only trace amounts of iron and aluminum.

25. The process as set forth in claim 24, wherein the aqueous cobalt-containing nickel sulphate solution may contain one or more of the metals selected from the group consisting of zinc, copper, manganese and magnesium.

26. The process as set forth in claim 25, wherein the aqueous cobalt-containing nickel sulphate solution contains one or more of the metals selected from the group consisting of zinc, copper, manganese and magnesium at a concentration of between 0.1 and 15 g/L.

27. The process as set forth in claim 25, wherein the aqueous cobalt-containing nickel sulphate solution contains one or more of the metals selected from the group consisting of zinc, copper, manganese and magnesium at a concentration of between 0.1 and 3 g/L.

28. The process as set forth in claim 27, wherein the organophosphorous acid is bis(2,4,4-trimethylpentyl) phosphinic acid.

29. The process as set forth in claim 28, wherein the water-immiscible organic solution containing an organophosphorous acid also includes an organic diluent.

30. The process as set forth in claim 29, wherein the water-immiscible organic solution containing an organophosphorous acid also includes a phase modifier.

31. The process as set forth in claim 1, wherein the ratio of aqueous to organic phases in step (a) is between about 0.2 and 5:1 by volume.

32. The process as set forth in claim 30, wherein the ratio of aqueous to organic phases in step (a) is between about 0.2 and 5:1 by volume.

33. The process as set forth in claim 1, wherein the ratio of aqueous to organic phases in step (a) is about 1:1 by volume.

34. The process as set forth in claim 30, wherein the ratio of aqueous to organic phases in step (a) is about 1:1 by volume.

35. The process as set forth in claim 1, wherein nickel is recovered from the cobalt depleted, nickel-enriched, raffinate by hydrogen reduction.

\* \* \* \* \*